US011560842B2

(12) United States Patent
Riou et al.

(10) Patent No.: US 11,560,842 B2
(45) Date of Patent: Jan. 24, 2023

(54) ACOUSTIC PANEL AND ASSOCIATED PROPULSION UNIT

(71) Applicant: SAFRAN AIRCRAFT ENGINES, Paris (FR)

(72) Inventors: Georges Jean Xavier Riou, Moissy-Cramayel (FR); Norman Bruno André Jodet, Moissy-Cramayel (FR); Jéremy Paul Francisco Gonzalez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 453 days.

(21) Appl. No.: 16/633,249

(22) PCT Filed: Jul. 25, 2018

(86) PCT No.: PCT/FR2018/051899
§ 371 (c)(1),
(2) Date: Jan. 23, 2020

(87) PCT Pub. No.: WO2019/020933
PCT Pub. Date: Jan. 31, 2019

(65) Prior Publication Data

US 2020/0173362 A1 Jun. 4, 2020

(30) Foreign Application Priority Data

Jul. 25, 2017 (FR) ..................................... 17 57051

(51) Int. Cl.
*F02C 7/045* (2006.01)
*B32B 3/12* (2006.01)
(Continued)

(52) U.S. Cl.
CPC ................ *F02C 7/045* (2013.01); *B32B 3/12* (2013.01); *B32B 3/266* (2013.01); *B64D 33/02* (2013.01);
(Continued)

(58) Field of Classification Search
CPC ....... B32B 3/266; B32B 3/12; B32B 2307/10; B32B 2605/18; F02C 7/045; B64D 33/02;
(Continued)

(56) References Cited

U.S. PATENT DOCUMENTS 2,645,301 A * 7/1953 De Vries .................. H04R 1/22 181/290
3,630,312 A * 12/1971 Woodward ................ E04B 1/86 428/116
(Continued)

FOREIGN PATENT DOCUMENTS

FR 2376994 A1 8/1978

OTHER PUBLICATIONS

Search Report issued in French Patent Application No. 17 57051 dated Apr. 10, 2018.
(Continued)

*Primary Examiner* — Jeremy A Luks
(74) *Attorney, Agent, or Firm* — Pearne & Gordon LLP

(57) ABSTRACT

An acoustic panel for an aircraft propulsion unit, comprises a core and an entry layer in contact with the core, the entry layer comprising lower elements and upper elements, each comprising an inner face, an outer face and at least one through-hole, the inner faces of the lower elements and upper elements being in contact with each other and forming a channel defining a baffle and opening into a cell of the core.

11 Claims, 4 Drawing Sheets

(51) Int. Cl.
*B32B 3/26* (2006.01)
*B64D 33/02* (2006.01)
*G10K 11/168* (2006.01)
*G10K 11/172* (2006.01)

(52) U.S. Cl.
CPC ........ *G10K 11/168* (2013.01); *B32B 2307/10* (2013.01); *B32B 2605/18* (2013.01); *B64D 2033/0206* (2013.01); *F05D 2260/96* (2013.01); *G10K 11/172* (2013.01)

(58) Field of Classification Search
CPC ......... B64D 2033/0206; G10K 11/168; G10K 11/172; F05D 2260/96
USPC .......................................................... 181/292
See application file for complete search history.

(56) References Cited

U.S. PATENT DOCUMENTS

2002/0036115 A1* 3/2002 Wilson .................... F02C 7/045 181/290
2004/0045766 A1 3/2004 Porte et al.
2010/0206664 A1 8/2010 Bagnall

OTHER PUBLICATIONS

International Search Report issued in Application No. PCT/FR2018/051899 dated Oct. 30, 2018.
Written Opinion issued in Application No. PCT/FR2018/051899 dated Oct. 30, 2018.

* cited by examiner

ACOUSTIC PANEL AND ASSOCIATED PROPULSION UNIT

This is the National Stage of PCT international application PCT/FR2018/051899, filed on Jul. 25, 2018 entitled "ACOUSTIC PANEL AND ASSOCIATED PROPULSION UNIT", which claims the priority of French Patent Application No. 17 57051 filed Jul. 25, 2017, both of which are incorporated herein by reference in their entirety.

TECHNICAL FIELD

The present invention concerns an acoustic panel for an aircraft propulsion unit, intended to be arranged at the edge of a fluid flow stream of the propulsion unit.

The invention also concerns a propulsion unit comprising such an acoustic panel.

The invention applies to the field of aircraft propulsion units and, more particularly, to acoustic panels arranged in such propulsion units.

PRIOR ART

It is known to provide a propulsion unit with acoustic panels in order to attenuate the noise generated by a turbomachine present in said propulsion unit. Such a noise is caused, for example, by the interaction of a rotor of the turbomachine with its environment.

In general, such acoustic panels are composed of a core having a honeycomb structure held between a first plate, intended to be in contact with a fluid flow in the propulsion unit, and a second plate, disposed opposite the first plate with respect to the honeycomb structure. In general, the first plate is provided with a plurality of necks, similar to tubes, extending in the cells of the core perpendicular to the first plate. In addition, the second plate is impermeable and rigid in order to reflect acoustic waves. In this case, each cell in which at least one neck extends, forms a Helmholtz resonator which is able to provide an acoustic attenuation through a visco-thermal dissipation effect at the openings through which the necks open into the cells. In this case, each cell forms a resonant cavity.

In a Helmholtz resonator, the frequency tuning, in other words the adjustment of the frequency for which a maximum acoustic attenuation is obtained, is controlled by the volume of the neck or necks, as well as by the volume of the associated resonant cavity. Due to the low height of the necks, the frequency tuning of the resonator is mainly controlled by the thickness of the honeycomb structure.

With such acoustic panels a satisfactory acoustic attenuation, at a given frequency, is obtained when the thickness of the cells is of order one quarter of the wavelength corresponding to said frequency.

Nevertheless, such acoustic panels do not give complete satisfaction.

More specifically, new generation turbomachines have a reduced nominal rotation speed and a reduced number of vanes when compared with preceding generations of turbomachines. This is manifest by the fact the noises generated by the new generation turbomachines have lower frequencies, in other words longer wavelengths, than the noises generated by preceding generations of turbomachines.

In the case of acoustic panels from the prior art, it is necessary to significantly increase the thickness of the acoustic panel when the frequency of the acoustic waves to be attenuated decreases. This leads to an increase in the bulk and mass of the acoustic panel, which is unacceptable, in particular in the case of airborne applications.

One aim of the invention is therefore to provide an acoustic panel for which the bulk and the mass depend less on the frequency of the acoustic waves to be attenuated than do conventional acoustic panels.

DISCLOSURE OF THE INVENTION

To this effect, the invention relates to an acoustic panel of the above-described type, the acoustic panel comprising a core and an entry layer, the core comprising a plurality of cells arranged so as to form a honeycomb structure, each cell opening onto a first face of the core and also onto a second face of the core situated opposite the first face, the entry layer comprising a lower element and an upper element, each lower element and upper element comprising a respective plate having an inner face and an outer face orientated opposite the inner face, each among the lower element and the upper element comprising at least one through-hole opening onto both the outer face and also onto the inner face, the inner face of at least one among the lower element and the upper element comprising, for at least one through-hole, a corresponding groove into which the through-hole opens, the inner face of the lower element being disposed opposite and in contact with the inner face of the upper element, each through-hole of one among the upper element and the lower element being opposite a groove of the other among the upper element and the lower element, in such a way as to form a channel with the groove and the through-hole of the other among the upper element and the lower element, which opens into the groove, the through-holes of each channel being offset in a direction different from a thickness direction of the entry layer, the entry layer extending opposite and in contact with the first face of the core, for each channel, the through-hole of the lower element opening into a cell of the core, and the through-hole of the upper element being intended to open into the fluid flow stream.

Indeed, in an acoustic panel according to the invention, each channel which opens into a cell of the honeycomb structure is similar to a neck of the Helmholtz resonator. Since the grooves are produced on the inner face of the lower element and/or of the upper element, as a result, each channel of the acoustic panel according to the invention extends substantially parallel to the entry layer, unlike conventional acoustic panels in which the neck of each Helmholtz resonator extends perpendicular to the entry layer.

Thus, with an acoustic panel according to the invention, it is easy to produce a frequency tuning in order to attenuate noise generated by new generation turbomachines, and to do so without modifying the thickness of the acoustic panel. Indeed, the frequency adjustment is simply made by modifying, for example, the dimensions of the grooves, and more particularly the length of the grooves, which does not require an increase in thickness of the entry layer. Such a modification of the dimensions of the grooves is manifest by a change in the volume of the channel, which leads to a change in the attenuation frequency of the panel.

An acoustic panel according to the invention therefore has a bulk and a mass which depend less on the frequency of the acoustic waves to be attenuated than do conventional acoustic panels.

According to other advantageous aspects of the invention, the acoustic panel comprises one or more of the following characteristics, taken alone or according to all the technically possible combinations:

the inner face of each among the lower element and the upper element comprises, for each through-hole, a corresponding groove into which the through-hole opens, each channel being formed by two respective grooves of the lower element and of the upper element opposite each other, and by the corresponding through-holes of the lower element and of the upper element;

for each groove, the corresponding through-hole opens, on the inner face, into one end of the groove;

for each channel, the corresponding grooves are entirely opposite each other;

the acoustic panel also comprises a reflective layer configured to reflect acoustic waves having a frequency belonging to a predetermined range, the reflective layer extending opposite and in contact with the second face of the core;

for each among the upper element and the lower element, the corresponding inner face comprises a plurality of grooves, the grooves being symmetrical with respect to a plane of symmetry, and, for at least one pair of mutually symmetrical grooves with respect to the plane of symmetry, the corresponding through-holes are disposed so as to open into ends of said grooves which are not mutually symmetrical with respect to the plane of symmetry;

the inner face of the one among the lower element and the upper element comprises at least one stud engaged in an associated cavity of the other among the lower element and the upper element, the cavity and the associated stud having complementary shapes;

for each among the upper element and the lower element, each groove is rectilinear and extends along a longitudinal axis parallel to a plane that is locally tangent to the corresponding inner face, and, for each groove, the corresponding through-hole has an axis orthogonal to the plane that is locally tangent to the inner face;

the groove has a depth less than or equal to half the length of the groove, preferably less than or equal to a third of the length of the groove, the length of the groove being defined by the extent of the groove along the longitudinal axis.

In addition, the invention relates to a propulsion unit for an aircraft, comprising at least one acoustic panel as described above.

BRIEF DESCRIPTION OF THE FIGURES

The invention will be better understood with the help of the following description, given by way of a non-limiting example only and with reference to the attached drawings, in which.

DETAILED DISCLOSURE OF THE SPECIAL EMBODIMENTS

Figure 1:
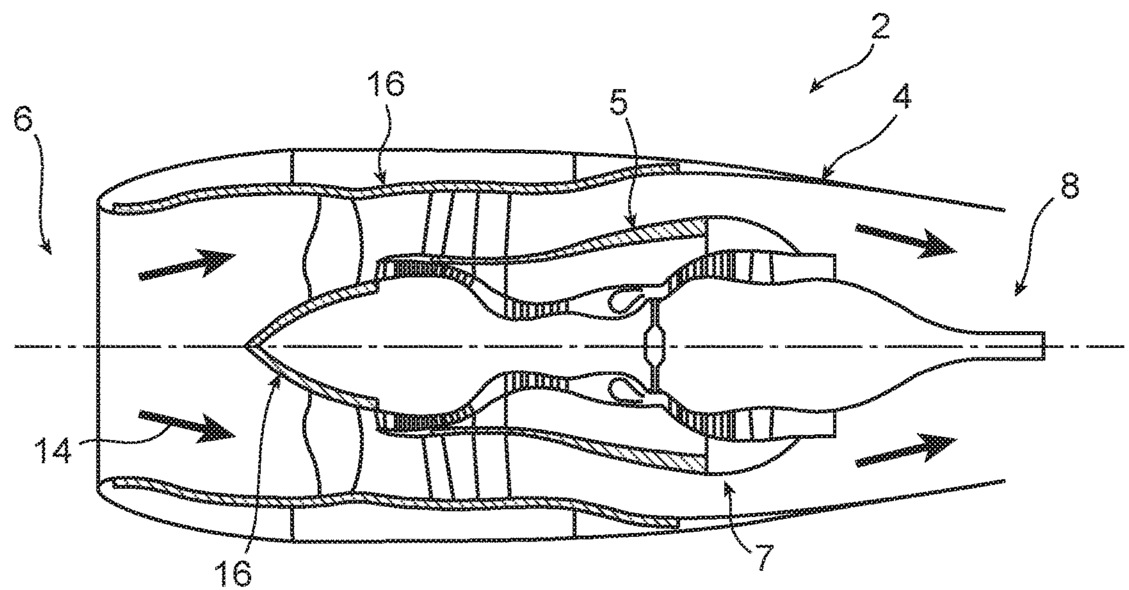
FIG. 1 is a sectional view of a propulsion unit according to the invention, in a longitudinal plane of the propulsion unit.

A propulsion unit 2 according to the invention is illustrated in FIG. 1.

The propulsion unit 2 comprises a nacelle 4 and a turbomachine, for example a turbojet engine 5.

The nacelle 4 surrounds the turbojet engine 5 and externally delimits a fluid flow stream comprising an air inlet channel 6, a secondary stream 7 and an exhaust channel 8.

The turbojet engine 5 is intended to generate, during its operation, a stream of air 14 flowing from the inlet channel 6 to the exhaust channel 8. The air stream 14 is illustrated by a set of arrows in FIG. 1.

The propulsion unit 2 also comprises at least one acoustic panel 16.

Each acoustic panel 16 is configured to attenuate acoustic waves having a frequency belonging to a predetermined frequency range.

Preferably, each acoustic panel 16 is incorporated in the nacelle 4 and/or in the turbojet engine 5, for example in order to delimit at least one axial section of at least one among the air inlet channel 6, the secondary stream 7 and the exhaust channel 8.

Preferably, a set of acoustic panels 16 in annular portions are mounted end-to-end circumferentially.

Figure 2:
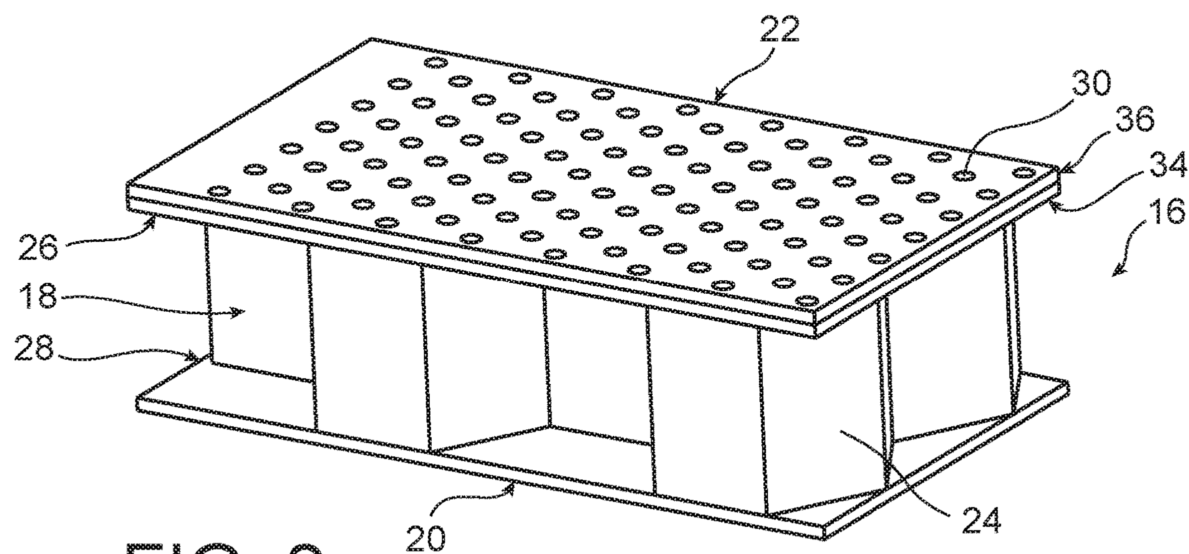
FIG. 2 is a prospective schematic view of an acoustic panel according to the invention.

With reference to FIG. 2, the acoustic panel 16 comprises a core 18, a reflective layer 20 and an entry layer 22.

The core 18 has a honeycomb structure. More precisely, the core 18 comprises a plurality of cells 24, arranged according to a known honeycomb structure.

Figure 7:
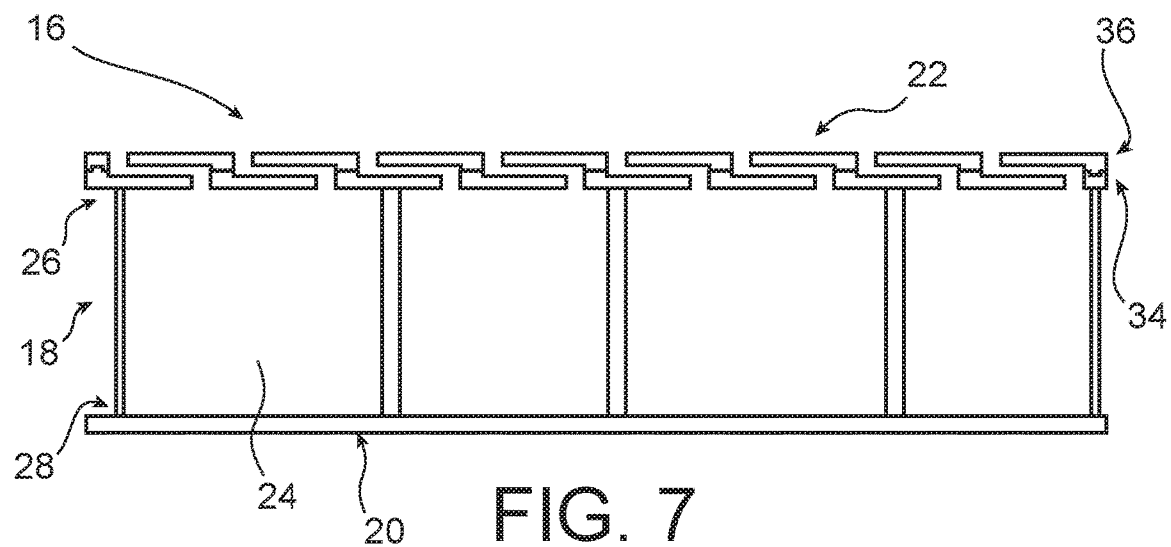
FIG. 7 is a schematic sectional view, along the plane of FIG. 5, of the acoustic panel of FIG. 2.

As can be seen in FIG. 7, each cell 24 opens onto a first face 26 of the core 18 and on to a second face 28 of the core 18 situated opposite the first face 26.

The first face 26 of the core 18 is that among the first face 26 and the second face 28, which is intended to be orientated towards the air stream 14. The second face 28 of the core is that, among the first face 26 and the second face 28, which is intended to be orientated opposite to the air stream 14.

Preferably, the core 18 is such that the distance between the first face 26 and the second face 28 is of order one quarter of the wavelength corresponding to a predetermined working frequency.

The working frequency is a frequency for which a maximum acoustic attenuation is desired. The working frequency belongs to the predetermined range of frequencies.

For example, the core 18 is made of metal, for example aluminium. According to another example, the core 18 is made from a composite material, such as a composite material formed of carbon fibres embedded in a hardened resin matrix.

The reflective layer 20 is suitable for reflecting acoustic waves having a frequency belonging to the predetermined range of frequencies.

The reflective layer 20 extends opposite the second face 28 of the core 18, being in contact with the second face 28. More precisely, the reflective layer 20 is rigidly attached to the second face 28 of the core 18, for example bonded to the second face 28 of the core 18.

For example, the reflective layer 20 is made of metal, for example aluminium. According to another example, the reflective layer 20 is made from a composite material, such as a composite material formed of carbon fibres embedded in a hardened resin matrix.

The entry layer 22 extends opposite the first face 26 of the core 18, being in contact with the first face 26. More precisely, the entry layer 22 is rigidly attached to the first face 26 of the core 18, for example bonded to the first face 26 of the core 18.

The entry layer 22 is arranged so that a through-hole 30 of at least one channel 32 of the entry layer 22 opens into a cell 24 of the core 18. The through-hole 30 and the channel 32 are described below.

The entry layer 22 will now be described with reference to FIGS. 3 to 7.

The entry layer 22 comprises a lower element 34 and an upper element 36.

Each of the lower element 34 and the upper element 36 comprises a respective plate 38.

For example, the plate 38 has a thickness between 0.5 mm (millimetres) and 2 mm.

The plate 38 comprises an inner face 40 and an outer face 42 oriented opposite the inner face.

The plate 38 is, for example, made from a composite material, such as a composite material formed of carbon fibres embedded in a hardened resin matrix.

Figure 4:
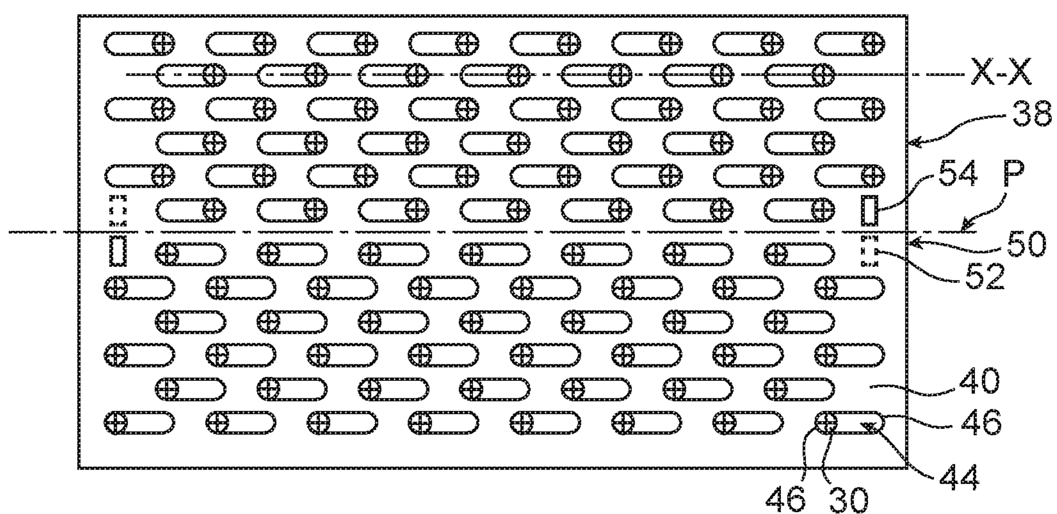
FIG. 4 is a top view of a second embodiment of an acoustic panel according to the invention.

As shown in FIG. 4, the inner face 40 of the plate comprises at least one groove 44. Each groove 44 has two opposite ends 46.

Preferably, each groove 44 is rectilinear and extends along a respective longitudinal axis X-X parallel to a plane that is locally tangent to the inner face 40.

The respective longitudinal axes of the grooves 44 may or may not be parallel to each other.

Preferably, each groove 44 has a depth less than or equal to half the length of the groove, preferably less than or equal to a third of the length of the groove. The length of the groove 44 is defined as the extent of the groove 44 along the longitudinal axis X-X.

Figure 5:
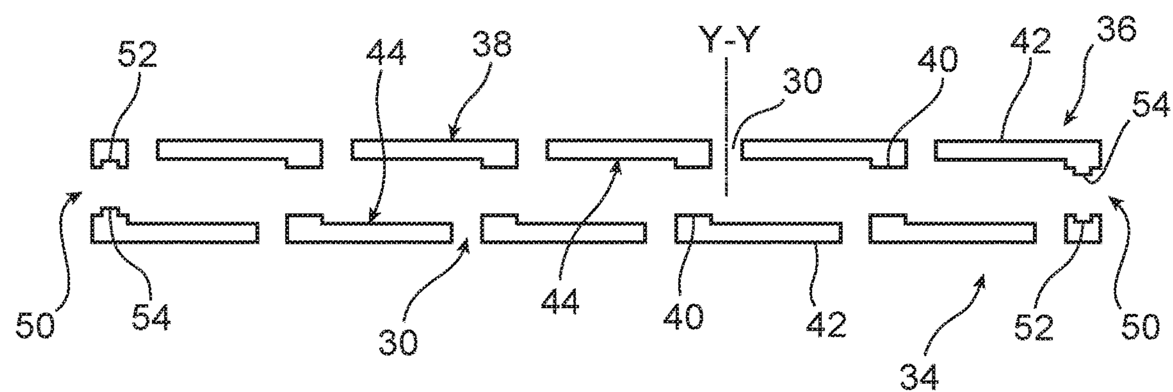
FIG. 5 is an exploded sectional view of an entry layer of the acoustic panel of FIG. 2, along a plane orthogonal to an outer face of the entry layer, and containing a longitudinal axis of channels of the entry layer.

Preferably, the grooves 44 are regularly disposed over the inner face 40 of the plate 38, as shown in FIGS. 4 and 5.

Each groove 44 is associated with a corresponding through-hole 30.

Each through-hole 30 opens both onto the inner face 40 in one end of the corresponding groove 44 and also onto the outer face of the plate 38.

Preferably, for each groove 44, the corresponding through-hole 30 has an axis Y-Y which is orthogonal to the plane that is locally tangent to the inner face 40.

The grooves 44 and the through-holes 30 are obtained, for example, by machining or by stamping of the plate 38, or even during production of the plate 38 by moulding.

Advantageously, the inner face 40 of the plate 38 has a plane of symmetry P. The plane of symmetry P is such that the grooves 44 are symmetric with respect to the plane of symmetry P.

In addition, for at least one pair of grooves 44 that are mutually symmetrical with respect to the plane of symmetry P, the corresponding through-holes 30 are disposed so as to open into ends 46 which are not mutually symmetrical with respect to the plane of symmetry P.

Figure 3:
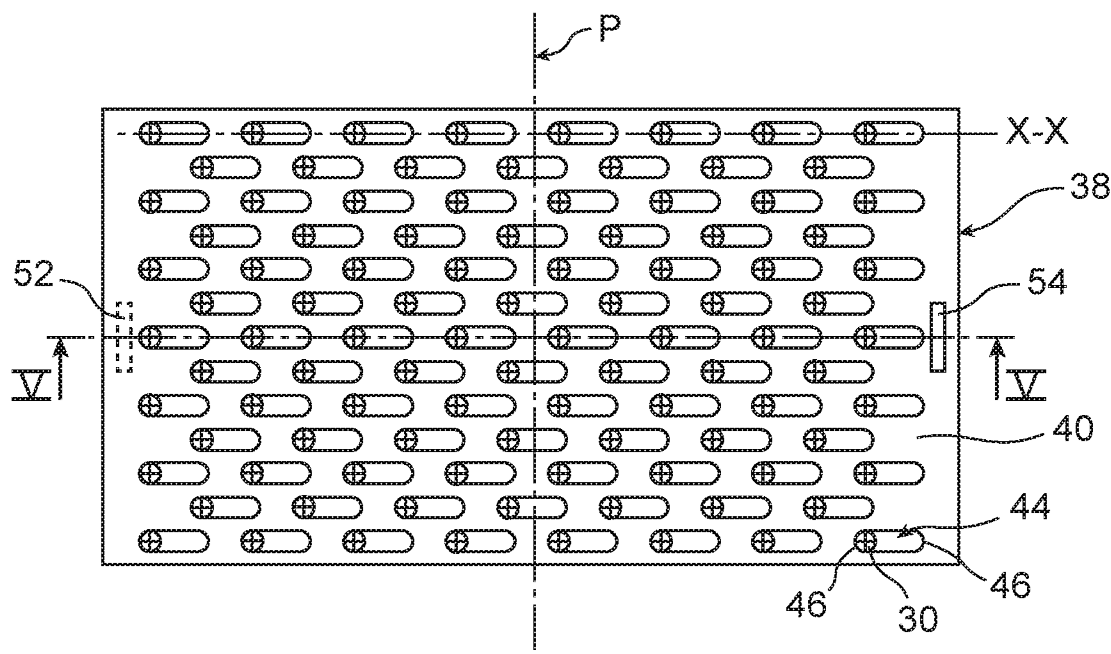
FIG. 3 is a top view of a first embodiment of an acoustic panel according to the invention.

For example, and as shown in FIG. 3, with a plane of symmetry P which is orthogonal to the longitudinal axis X-X of the grooves 44, the through-holes 30 are all disposed on a same side of the plate 38, in other words on the left side in FIG. 3.

According to another example, illustrated by FIG. 4, with a plane of symmetry P locally orthogonal to the inner face 40 and parallel to the longitudinal axis X-X of the grooves 44, the through-holes 30 which are located on one side of the plane of symmetry P (at the top in FIG. 4) are all disposed on a same side of the plate 38 (on the right in FIG. 4), and the through-holes 30 which are located on the other side of the plane of symmetry P (at the bottom in FIG. 4) are all disposed on a same second side of the plate 38 (on the left in FIG. 4), opposite the first side.

Advantageously, the inner face 40 comprises a fool-proofing device 50.

The fool-proofing device 50 comprises at least one cavity 52 associated with a corresponding stud 54.

The cavity 52 and the associated stud 54 have complementary shapes.

In addition, on the inner face 40, the position of the cavity 52 and the position of the associated stud 54 are symmetrical with respect to the plane of symmetry P.

In order to form the entry layer 22, the inner face 40 of the lower element 34 is disposed opposite the inner face 40 of the upper element 36, as illustrated in FIG. 5.

Then, the inner face 40 of the lower element 34 is brought into contact with the inner face 40 of the upper element 36, so that at least one groove 44 of the upper element 36 is arranged opposite a corresponding groove 44 of the lower element 34, in order to form the channel 32.

More precisely, the edges of the grooves 44 arranged opposite each other are entirely superposed.

Figure 6:
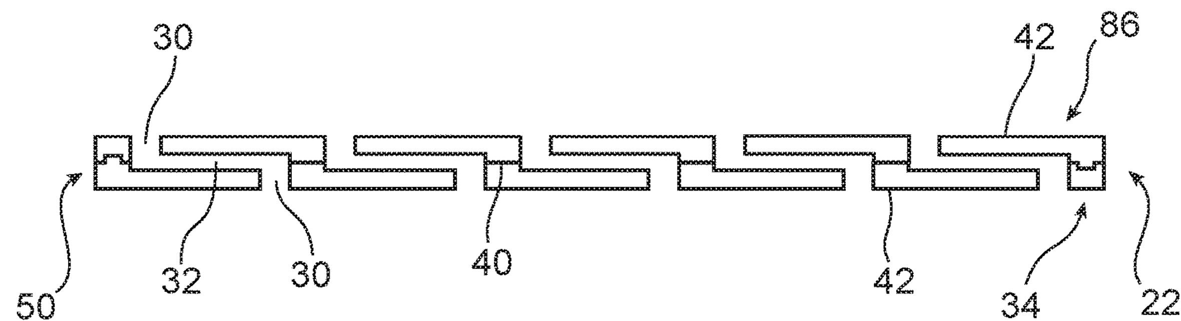
FIG. 6 is a sectional view of the entry layer of the acoustic panel of FIG. 2, along the plane of FIG. 5.

In addition, the through-hole 30 of the groove 44 of the upper element 36 and the through-hole 30 of the groove 44 of the lower element 34 are respectively disposed at opposite ends of the channel 32, as illustrated by FIG. 6. In other words, each through-hole 30 of one among the lower element 34 and the upper element 36 is located facing a solid portion of a bottom of the corresponding groove 44 of the other among the lower element 34 and the upper element 36.

Thus, in a plane orthogonal to the respective inner faces 40 of the elements 34, 36 forming the entry layer 22, each channel 32 defines a baffle, as shown in FIGS. 6 and 7.

More generally, the through-holes 30 of a given channel 32 are offset with respect to each other in a direction different from a thickness direction of the entry layer 22.

In addition, the length of the channel 32, in other words the spatial extent of the channel 32 in the longitudinal direction of the corresponding grooves 42, is advantageously greater than or equal to the thickness of the entry layer 22.

In addition, the portion of the baffle defined by the channel 32 which has the greatest length corresponds to the portion delimited by the grooves 44, in other words the portion of the channel 32 extending parallel to the respective inner faces 40 of the elements 34, 36 along the longitudinal axis of said grooves 44.

Preferably, the lower element 34 and the upper element 36 are rigidly attached to each other, for example by bonding.

Preferably, the channel 32 has a cross-sectional area between 0.1 $mm^2$ (square millimetres) and 10 $mm^2$, for example between 0.2 $mm^2$ and 7 $mm^2$.

Preferably, the lower element 34 has a symmetry such as that described above, and the lower element 34 and the upper element 36 are similar. In this case, the upper element 36 is such that, on performing a rotation of 180° of the upper element 36 about an axis belonging both to the inner face 40 of the upper element 36 and to the plane of symmetry P, the upper element 36 coincides perfectly with the lower element 34.

In this case, each pair of symmetric grooves 44 of the lower element 34 is disposed opposite the same pair of symmetric grooves 44 of the upper element 36.

Preferably, at least one stud 54 of the inner face 40 of the plate 38 of one among the lower element 34 and the upper element 36 is engaged in an associated cavity 52, having a complementary shape to said stud 54, formed in the other among the lower element 34 and the upper element 36.

In the case where the lower element 34 has a symmetry such as that described above, comprises a fool-proofing device 50 and is similar to the upper element 36, the stud 54 of the fool-proofing device 50 of the upper element 36 is engaged in the cavity 52 of the fool-proofing device 50 of the lower element 34, and the stud 54 of the lower element 34 is engaged in the cavity 52 of the upper element 36.

With such an acoustic panel 16, the working frequency, denoted $f_0$ and expressed in hertz, is connected, in a first approximation (in other words when the grazing flow effects are not included), to the parameters of the acoustic panel 16 by the following relation:

$$f_0 = \frac{C}{2\pi}\sqrt{\frac{S}{Vl'}}$$

where C is the speed of sound, in metres per second;

S is a cross-sectional area of the channel 32, in square metres;

V is a volume of the cell 24, in cubic metres; and

I is a corrected length of the channel 32, in metres.

The corrected length of the channel 32 is given by the following relation:

$$l' = l + 1.7r(1 - 0.7\sqrt{\vec{\sigma}})$$

where l if the length of the channel 32, equal, in the case where the channel 32 is formed by two perfectly superposed grooves 44, to the length of one of the grooves 44, in metres;

r is a diameter of a corresponding through-hole 30, in metres; and

σ is a perforation rate of the lower element 34, only taking into account the through-holes 30 associated with a channel 32 for which a corresponding through-hole 30 exists in the upper element 36. The perforation rate σ is equal to the result of dividing the total surface area of the through-holes 30 by the surface area of the portion of the outer face 42 of the lower element 34 provided with through-holes 30.

Each channel 32 is formed by a single respective through-hole 30 of the lower and upper elements 34, 36, and the corresponding grooves 44. In addition, each channel 32 does not communicate with any other channel 32 of the entry layer 22.

Figure 8:
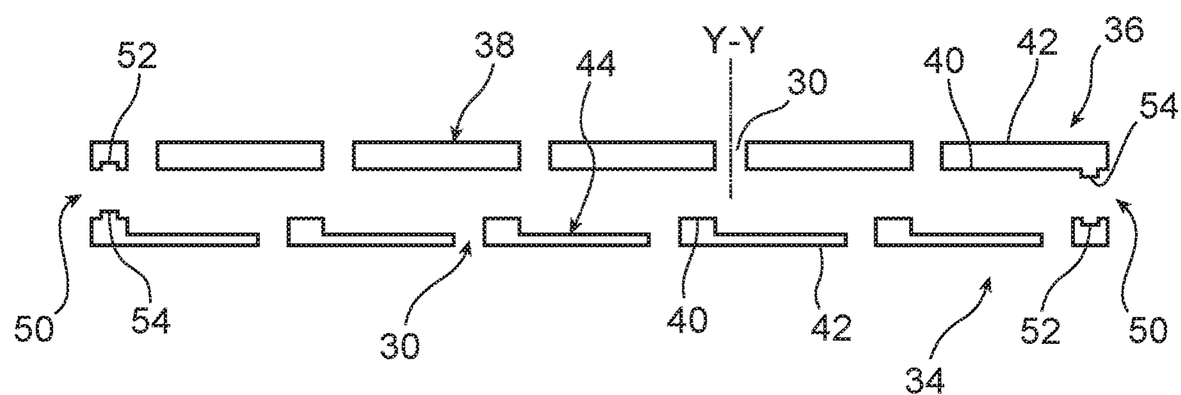
FIG. 8 is an exploded sectional view of an entry layer of a third embodiment of an acoustic panel according to the invention, along a plane orthogonal to an outer face of the entry layer and containing a longitudinal axis of channels of the entry layer.
Figure 9:
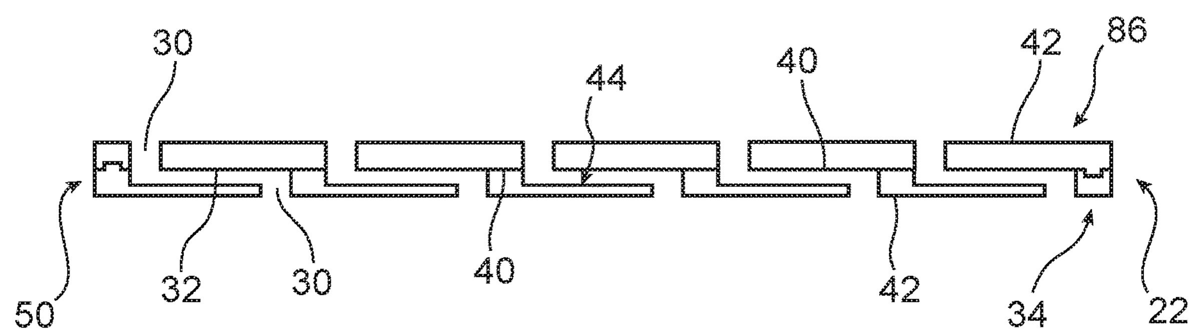
FIG. 9 is a non-exploded sectional view of the entry layer of the acoustic panel of FIG. 8, along the plane of FIG. 8.

According to a variant illustrated by FIGS. 8 and 9, at least one through-hole 30 of at least one among the lower element 34 and the upper element 36 does not open into any groove of the same element. More precisely, said through-hole 30 opens directly both onto the outer face 42 of the element considered and also on to the inner face 40 of said element. In this case, when the lower element 34 and the upper element 36 are assembled, said through-hole 30, opening directly both onto the outer face 42 and onto the inner face 40, is arranged opposite a corresponding groove 44 of the other element among the lower element 34 and the upper element 36, advantageously at a distance from the through-hole 30 formed in this other element and opening into this latter groove 44.

For example, in the case of a through-hole 30 opening directly both onto the outer face 42 and onto the inner face 40 of the lower element 34, the channel 32 is formed by said through-hole 30 of the lower element 34, the corresponding groove 44 of the upper element 36, the through-hole 30 formed in the upper element 36 and opening into said groove 44 and the portion of the inner face 40 of the lower element 34 which is situated opposite the groove 44.

For example, in the case of a through-hole 30 opening directly onto the outer face 42 and onto the inner face 40 of the lower element 36, the channel 32 is formed by said through-hole 30 of the upper element 36, the corresponding groove 44 of the lower element 34, the through-hole 30 formed in the lower element 34 and opening into said groove 44 and the portion of the inner face 40 of the upper element 36 which is situated opposite the groove 44.

An acoustic panel 16 according to the invention allows the implementation of an acoustic attenuation for low frequencies associated with the new generation of turbomachines, without a significant increase in the mass or bulk of the acoustic panel 16. This effect is obtained by the implementation of an entry layer 22 in which the channels 32, similar to the necks of the usual Helmholtz regulators, extend in a longitudinal direction with respect to the acoustic panel 16. Thanks to such a geometry, the elongation of the channel 32, dictated by the need to attenuate a lower frequency, does not lead to a significant increase in the thickness of the acoustic panel 16.

The symmetry of the lower and upper elements 34, 36 leads to a reduction in manufacturing costs, the lower and upper elements 34, 36 being identical and obtained by a same process. Indeed, such a symmetry ensures a covering of the grooves of the lower element 34 with the grooves of the upper element 36 in order to form the channels 32 of the entry layer 22.

The presence of the fool-proofing device 50 allows a precise positioning of the lower element 34 with respect to the upper element 36, and facilitates assembly operations.

What is claimed is:

1. An acoustic panel for an aircraft propulsion unit, intended to be arranged at the edge of a fluid flow stream of the propulsion unit, the acoustic panel comprising:

a core having an opposing first face and second face, and comprising a plurality of cells designed to form a honeycomb structure, each cell opening onto the first face and the second face; and an entry layer extending opposite and in contact with the first face of the core, the entry layer comprising a lower element and an upper element, each of the lower element and the upper element comprising a plate having an opposing inner face and outer face, the inner face of each plate being disposed opposite and in contact with the inner face of the other plate, each plate comprising at least one through-hole opening onto the outer face and the inner face of said plate, the inner face of at least one plate comprising, for at least one through-hole, a corresponding groove into which the through-hole opens, each groove of each plate being opposite a through-hole of the other plate, in such a way as to form a channel comprising the groove, the through-hole which opens into the groove and the through-hole opposite the groove, for each channel, the through-holes being offset in a direction different from a direction of thickness of the entry layer, the through-hole of the plate of the lower element opening into a cell of the core, and the through-hole of the plate of the upper element being intended to open into the fluid flow stream.

2. The acoustic panel according to claim 1, wherein the inner face of each plate comprises, for each through-hole, a corresponding groove into which the through-hole opens, each channel being formed by two respective grooves of the plate of the lower element and of the plate of the upper element situated opposite each other, and by the corresponding through-holes of the plate of the lower element and of the plate of the upper element.

3. The acoustic panel according to claim 1, wherein, for each groove, the corresponding through-hole opens, on the inner face, into one end of the groove.

4. The acoustic panel according to claim 2, wherein, for each groove, the corresponding through-hole opens, on the inner face, into one end of the groove, and wherein, for each channel, the corresponding grooves are entirely opposite each other.

5. The acoustic panel according to claim 1, comprising, in addition, a reflective layer configured to reflect acoustic waves having a frequency belonging to a predetermined range, the reflective layer extending opposite and in contact with the second face of the core.

6. The acoustic panel according to claim 1, wherein, for each plate, the corresponding inner face comprises a plurality of grooves, the grooves being symmetrical with respect to a plane of symmetry, and, for at least one pair of grooves that are mutually symmetrical with respect to the plane of symmetry, the corresponding through-holes are disposed so as to open into ends of said grooves which are not mutually symmetrical with respect to the plane of symmetry.

7. The acoustic panel according to claim 1, wherein the inner face of one plate comprises at least one stud engaged in an associated cavity of the other plate, the cavity and the associated stud having complementary shapes.

8. The acoustic panel according to claim 1, wherein, for each plate, each groove is rectilinear and extends along a longitudinal axis parallel to a plane that is locally tangent to the corresponding inner face, and, for each groove, the corresponding through-hole has an axis orthogonal to the plane that is locally tangent to the inner face.

9. The acoustic panel according to claim 8, wherein the groove has a depth less than or equal to half the length of the groove, the length of the groove being defined by the extent of the groove along the longitudinal axis.

10. A propulsion unit for an aircraft, comprising at least one acoustic panel according to claim 1.

11. The acoustic panel according to claim 8, wherein the groove has a depth less than or equal to a third of the length of the groove.

* * * * *